(12) United States Patent
Dames

(10) Patent No.: US 9,743,571 B2
(45) Date of Patent: Aug. 29, 2017

(54) AGRICULTURAL INTER-SEEDER ROTOR

(71) Applicant: Matthew W. Dames, Clarion, IA (US)

(72) Inventor: Matthew W. Dames, Clarion, IA (US)

(73) Assignee: Hagie Manufacturing Company, Clarion, IA (US)

(*) Notice: Subject to any disclaimer, the term of this patent is extended or adjusted under 35 U.S.C. 154(b) by 51 days.

(21) Appl. No.: 15/013,165

(22) Filed: Feb. 2, 2016

(65) Prior Publication Data
US 2016/0157421 A1 Jun. 9, 2016

Related U.S. Application Data

(62) Division of application No. 14/156,778, filed on Jan. 16, 2014, now Pat. No. 9,451,738.

(51) Int. Cl.
| | |
|---|---|
| *A01C 5/06* | (2006.01) |
| *A01C 7/08* | (2006.01) |
| *A01C 7/12* | (2006.01) |
| *A01C 7/18* | (2006.01) |
| *A01C 7/20* | (2006.01) |
| *A01B 49/06* | (2006.01) |

(52) U.S. Cl.
CPC .............. *A01B 49/06* (2013.01); *A01C 5/062* (2013.01); *A01C 5/064* (2013.01); *A01C 5/066* (2013.01); *A01C 7/08* (2013.01); *A01C 7/127* (2013.01); *A01C 7/18* (2013.01); *A01C 7/20* (2013.01); *A01C 7/201* (2013.01); *A01C 7/208* (2013.01)

(58) Field of Classification Search
CPC .. A01C 5/062; A01C 5/06; A01C 5/00; A01C 5/064; A01C 5/066; A01C 7/08; A01C 7/00; A01C 7/127; A01C 7/12; A01C 7/18; A01C 7/20; A01C 7/201; A01C 7/208; A01B 49/06; A01B 49/04; A01B 49/00
See application file for complete search history.

(56) References Cited

U.S. PATENT DOCUMENTS

| | | | |
|---|---|---|---|
| 4,100,862 | A | 7/1978 | Mowen et al. |
| 5,628,262 | A | 5/1997 | Nelson |
| 7,409,916 | B2 | 8/2008 | Fry et al. |
| 2006/0016375 | A1 | 1/2006 | Fry et al. |

*Primary Examiner* — Christopher J Novosad
(74) *Attorney, Agent, or Firm* — Brett J. Trout

(57) ABSTRACT

A system for planting cover crop seeds in fields with standing row crops, including a high-clearance agricultural vehicle with a high-clearance toolbar, soil sealers, and a seeder with a reciprocator above the soil sealers to deliver various types of seeds onto the disrupted soil after which the soil sealers cover the seeds with soil.

8 Claims, 11 Drawing Sheets

US 9,743,571 B2

AGRICULTURAL INTER-SEEDER ROTOR

TECHNICAL FIELD

The present invention relates in general to an agricultural seeder and, more particularly, to an agricultural seeder for applying cover crop to an existing late-season row crop.

BACKGROUND OF THE INVENTION

Agricultural planting systems are well known in the art. Such systems include a plurality of bins for retaining seeds, seeders for dispensing the seeds and soil disrupters to cover the seeds with soil after planting. Once a crop moves into the late season prior to harvest, nitrogen remaining in the soil is often lost through run-off. It would, therefore, be desirable to provide a system for retaining nitrogen in the soil. Such a system would not only reduce the amount of undesirable nitrogen run-off into nearby water supplies, but would reduce the amount of nitrogen needed to be applied to the subsequent year's crop. Additionally, it would be desirable to provide a secondary crop into the late season row crop to provide a second harvest.

It is known in the prior art to apply cover crops such as rye, winter wheat, clover, radish, turnips and other crops. Such seeds are typically spread over the late season cash crop in a broadcast manner, such as by airplane or similar broadcast system. One drawback to such application of cover crops is the inadequate coverage of the seeds with soil, inhibiting germination, even coverage and growth of the cover crops.

Due to the low clearance of prior art planters, it is not possible to run a low clearance prior art planter through an existing crop of late season corn or soybeans. It would, therefore, be desirable to provide a system for applying a cover crop to an existing late season cash crop in a manner that covered the cover crop seeds with soil. The difficulties encountered in the prior art discussed hereinabove are substantially eliminated by the present invention.

SUMMARY OF THE DISCLOSED SUBJECT MATTER

In the preferred embodiment of this invention, a system for applying seed below soil is provided. A first arm assembly and a second arm assembly are coupled to a frame. The first arm assembly, second arm assembly and frame define an area sufficient to accommodate the passage of a plant at least approximately one meter in height. A seeder and soil disrupter are coupled to the first arm assembly to allow the system to apply seeds for cover crop in existing late season row crops.

BRIEF DESCRIPTION OF THE DRAWINGS

The present invention will now be described, by way of example, with reference to the accompanying drawings in which.

DETAILED DESCRIPTION OF THE DRAWINGS

Figure 1A:
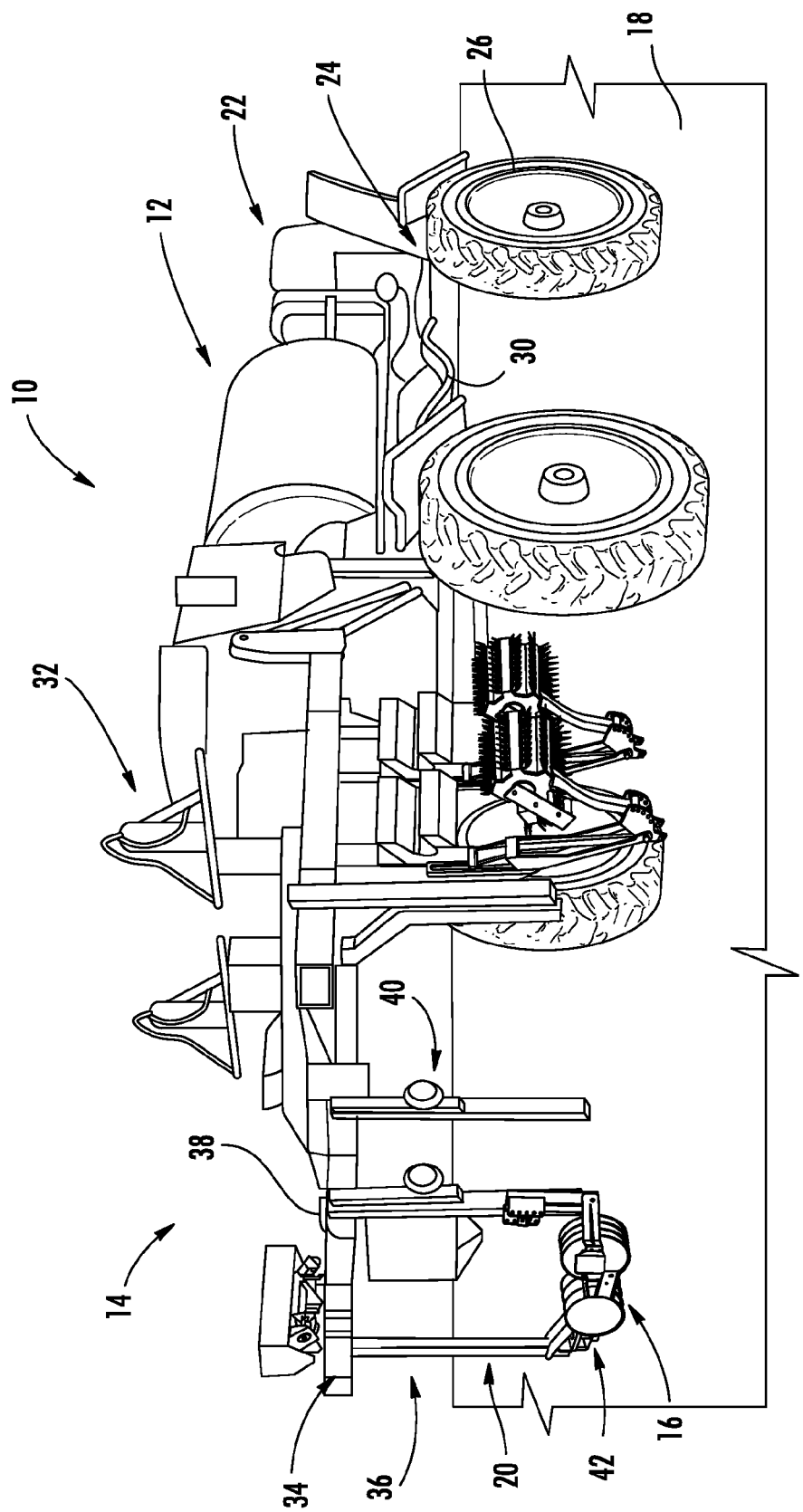
FIG. 1A illustrates a rear perspective view of the agricultural inter-seeder of the present invention.
Figure 1B:
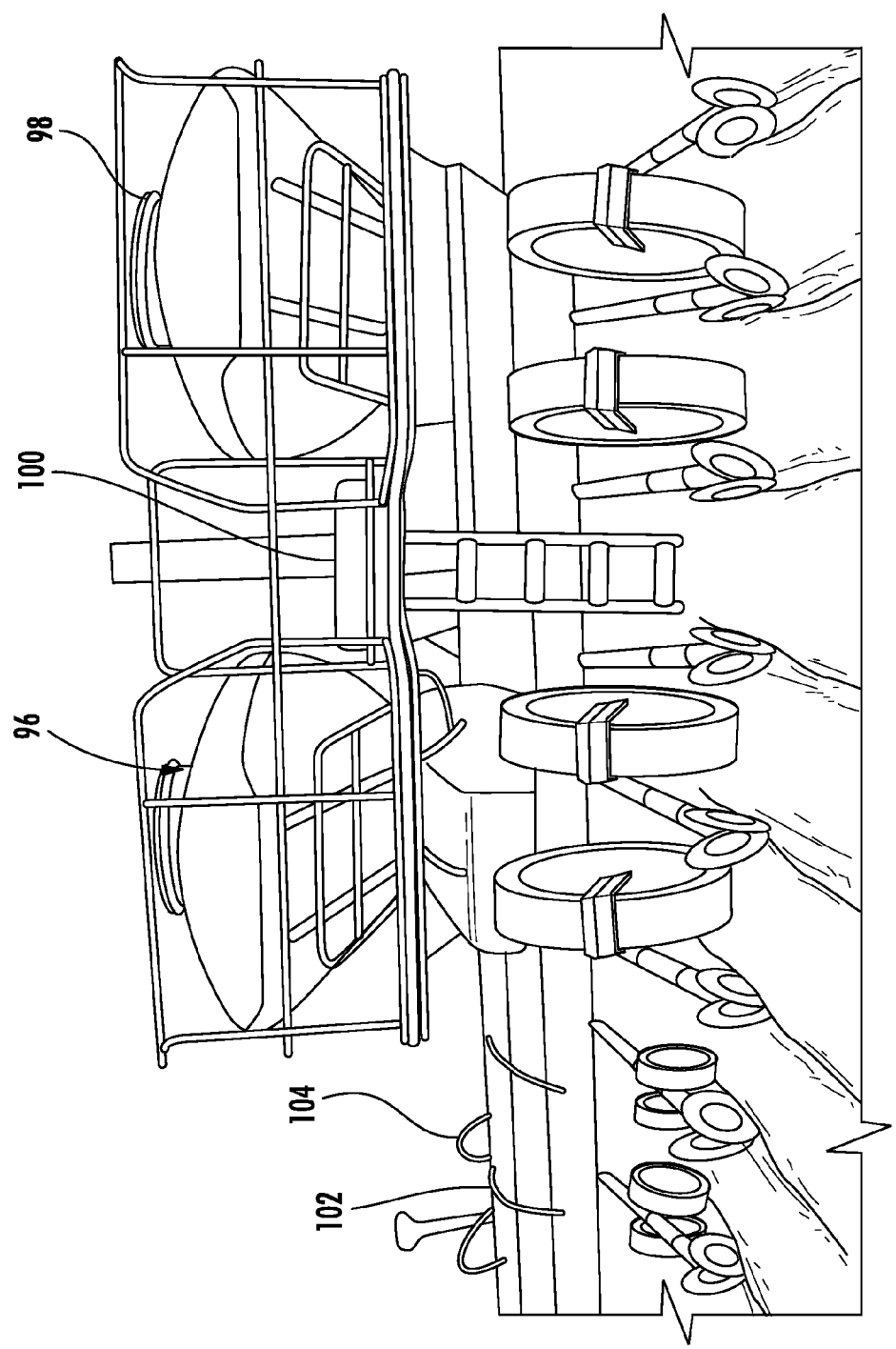
FIG. 1B illustrates a front perspective view of the inter-seeder system of FIG. 1A.

An agricultural inter-seeder is shown generally as (10) in FIGS. 1A-B. The inter-seeder (10) is designed to plant cover crop seeds between standing row crops, but may be used for any desired purpose. The agricultural inter-seeder (10) has a high clearance agricultural vehicle (12) coupled to a toolbar assembly (14). While the vehicle (12) may be of any type known in the art, in the preferred embodiment, the vehicle (12) is an STS16 Sprayer, manufactured by Hagie Manufacturing Company of Clarion, Iowa, described in U.S. Pat. No. 6,962,210, which is incorporated herein by reference.

The toolbar assembly (14) is a seeder for planting seeds (16) in a field (18) between standing row crops (20). The vehicle (12) is provided with a hydraulic motor (22), a frame (24) and large narrow wheels (26) to provide the vehicle (12) with a clearance preferably of at least 1.0 meter in height, more preferably at least 1.5 meters and, most preferably at least 1.75 meters in height. The hydraulic motor (22) is coupled, in a manner such as that well known in the art, to a plurality of hydraulic lines (30). The hydraulic lines (30) are coupled to an agricultural implement mount system (32), such as those well known in the art to raise, lower, engage and disengage the toolbar assembly (14).

The toolbar assembly (14) includes a frame (34) which, in the preferred embodiment, is a hollow steel tube having a square cross-section. Depending from the frame (34) is a plurality of arm assemblies (36). The arm assemblies (36) are coupled to the frame (34) by bolts, weldments or, in the preferred embodiment, by a combination of U-bolts (38) that extend around the frame (34) and secure the arm assemblies (36) thereto. The arm assemblies (36) are preferably constructed of hollow steel tubes having a square cross-section, preferably between 5.0 and 30.0 centimeters in width, more preferably between 7.0 and 27.0 centimeters in width and, most preferably, approximately 15.0 centimeters in width.

Figure 3:
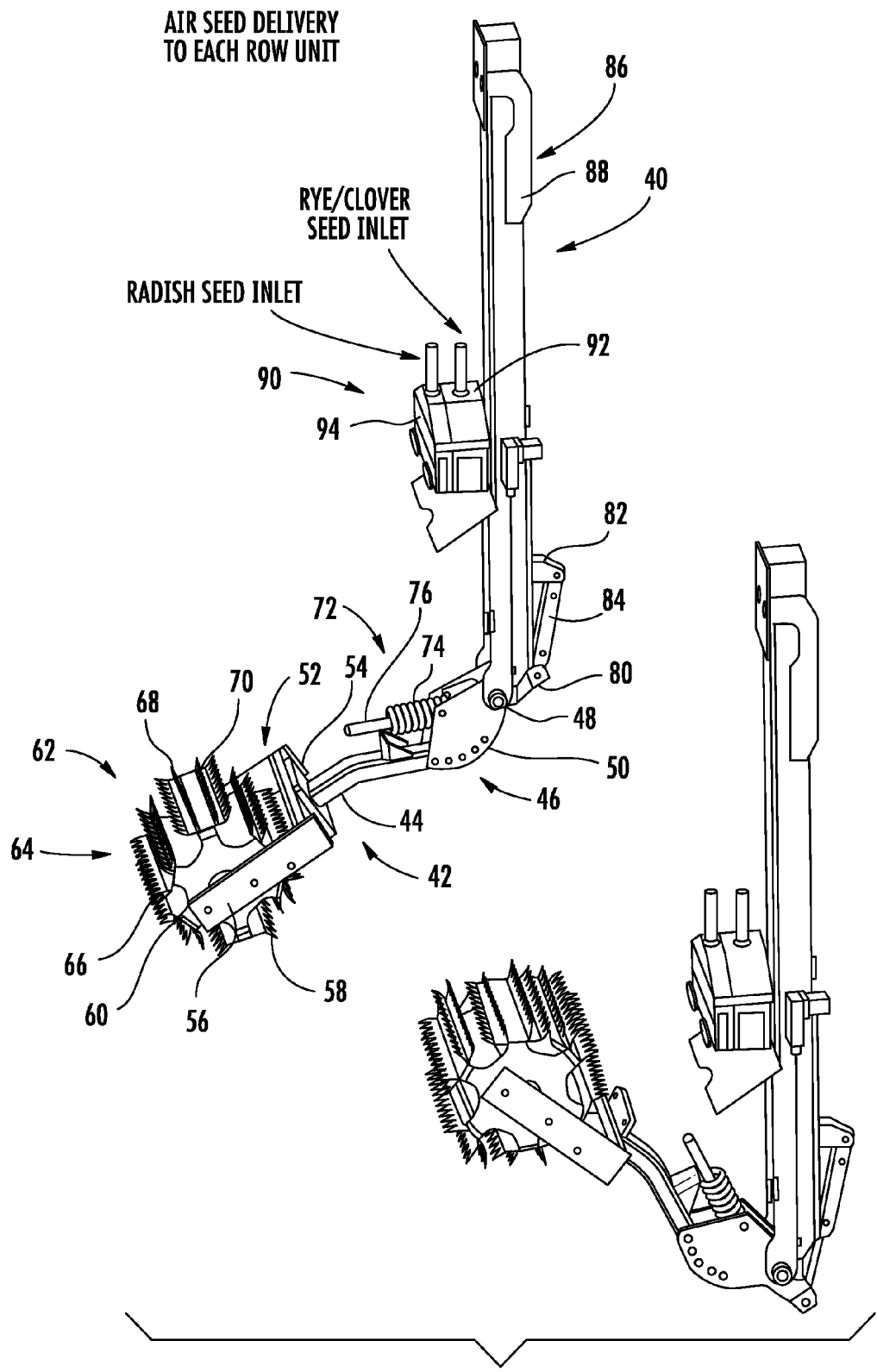
FIG. 3 illustrates a rear perspective view of two depending legs of the inter-seeder system of FIG. 1A.

Each arm assembly (36) preferably has a depending portion (40) and a trailing portion (42). As shown in FIG. 3, the trailing portion (42) of the arm assembly (36) is a steel bar (44) provided with a shoulder assembly (46) pivotably coupled to the depending portion (40) of the arm assembly (36) by a pin (48). The pin (48) may be a bolt or other type of pin provided through holes in the shoulder assembly (46) and depending portion (40) of the arm assembly (36) and secured thereto by a nut or similar securement device known in the art. The shoulder assembly (46) is provided with a plurality of holes (50) to allow adjustment of the angle of the trailing portion (42) of the arm assembly (36) relative to the depending portion (40). Secured to the opposite end of the trailing portion (42) of the arm assembly (36) is a fork assembly (52).

The fork assembly (52) includes a base plate (54) welded or otherwise secured to a pair of legs (56). While the base plate (54) and legs (56) may be constructed of any suitable material, in the preferred embodiment they are constructed of plate steel. The legs (56) are preferably provided with holes (58) through which is provided an axle (60) that extends through a soil sealer (62), which in the preferred embodiment is capable of providing soil over seed placed on the soil. The soil sealer (62) may be any type of implement used to move the soil as the arm assemblies (36) are dragged across a field (18) (FIGS. 1A-B, 2 and 3). The soil sealer (62) may include, but is not limited to, seedbed row openers, packing wheels, coulters, or any other type of soil disrupter known in the art. In the preferred embodiment, the soil sealer (62) is a rolling basket (64) constructed of two steel side plates (66) welded or otherwise secured to a plurality of staves (68). While the staves (68) may be constructed of any material known in the art, in the preferred embodiment, the staves (68) are constructed of steel plates integrally formed with two sets of steel teeth (70) extending along either side of each stave (68). Alternatively, the teeth (70) may be removable from the stave (68). The axle (68) passes through the holes (58) and the fork assembly (52) and holes in the side plates (66) of the rolling basket (64). The axle (68) is secured in a manner that allows the rolling basket (64) to rotate as the arm assemblies (36) are pulled across the field (18).

The trailing portion (42) of the arm assembly (36) is provided with a return assembly (72). The return assembly (72) is an eyebolt (74), the eye through which is provided the pin (48). A spring (76) is provided around the body of the eyebolt (74) and the eyebolt (74) rests on a return bracket (78) constructed of steel and welded to the trailing portion (42) of the arm assembly (36). The return assembly (72) acts to allow the trailing portion (42) of the arm assembly (36) to pivot upward relative to the depending portion (40) of the arm assembly (36) as the trailing portion (42) travels over rocks or other material that would otherwise damage the trailing portion (42). As the trailing portion (42) pivots upward relative to the depending portion (40), the spring (76) contacts the return bracket (78) and compresses the spring (76). Once the trailing portion (42) passes the hazard, the spring (76) provides sufficient force against the return bracket (78) to force the trailing portion (42) downward relative to the depending portion (40). While a spring (76) is used in the preferred embodiment, any desired type of return mechanism known in the art may be used.

Figure 4:
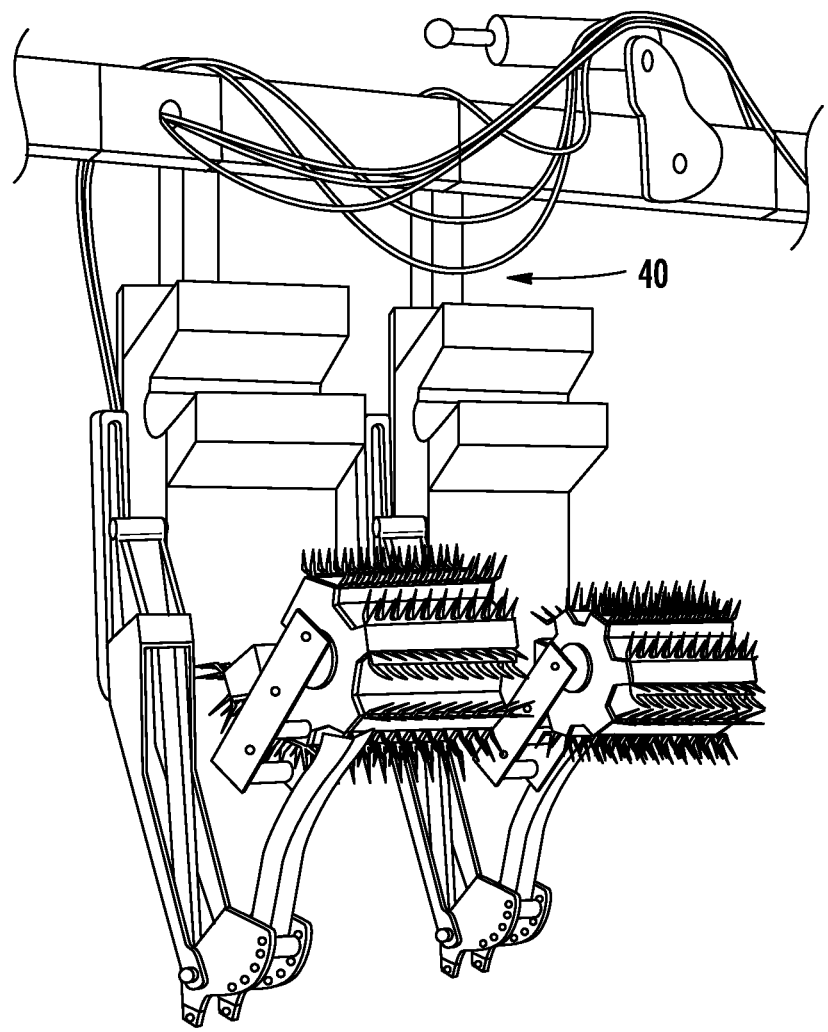
FIG. 4 illustrates a rear perspective view of two depending legs of the inter-seeder system of FIG. 1A as shown with the trailing legs retracted.

As shown in FIGS. 3-4, the trailing portion (42) is also provided with a steel lever (80) integrally formed with or welded to the steel bar (44). A steel ear (82) is welded to the depending portion (40) of the arm assembly (36). Pivotally secured to both the lever (80) and ear (82) is a linear actuator (84) that, in the preferred embodiment, is a hydraulic cylinder. Alternatively, the linear actuator (84) may be of pneumatic, electric, screw type or any other type of linear actuator known in the art.

The linear actuator (84) is coupled to by the hydraulic lines (30) to the hydraulic motor (28) to allow the soil sealer (62) to be lifted off of the field (18) by actuating the linear actuator (84), thereby causing downward pressure on the lever (80) and causing the trailing portion (42) to pivot, thereby lifting the soil sealer (62) above the ground as shown in FIGS. 3-4.

Figure 2:
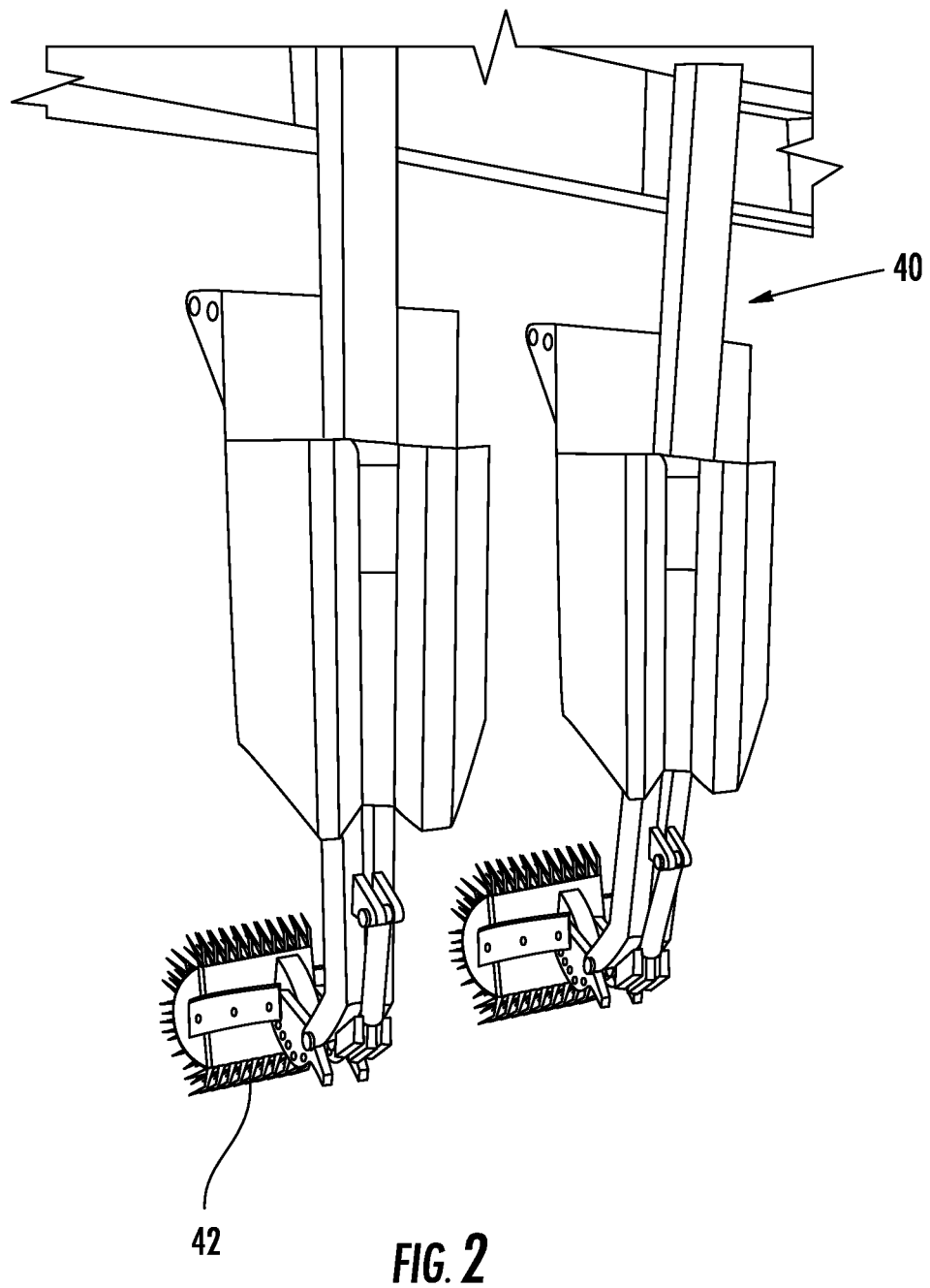
FIG. 2 illustrates a front perspective view of two depending legs of the inter-seeder system of FIG. 1A.

As shown in FIGS. 2-4, releasably secured to the depending portion (40) of the arm assemblies (36) by bolts or similar securement means is a crop shield (86). The crop shield (86) is preferably provided with angled shoulders (88) to contact any row crops (20) coming into contact with the crop shield (86) and gently guides the row crops (20) away from the depending portion (40) of the arm assemblies (36). The crop shield (86) reduces damage to the row crops (20) that might otherwise be broken off by the agricultural inter-seeder (10) as it moves through the field (18).

Figure 5:
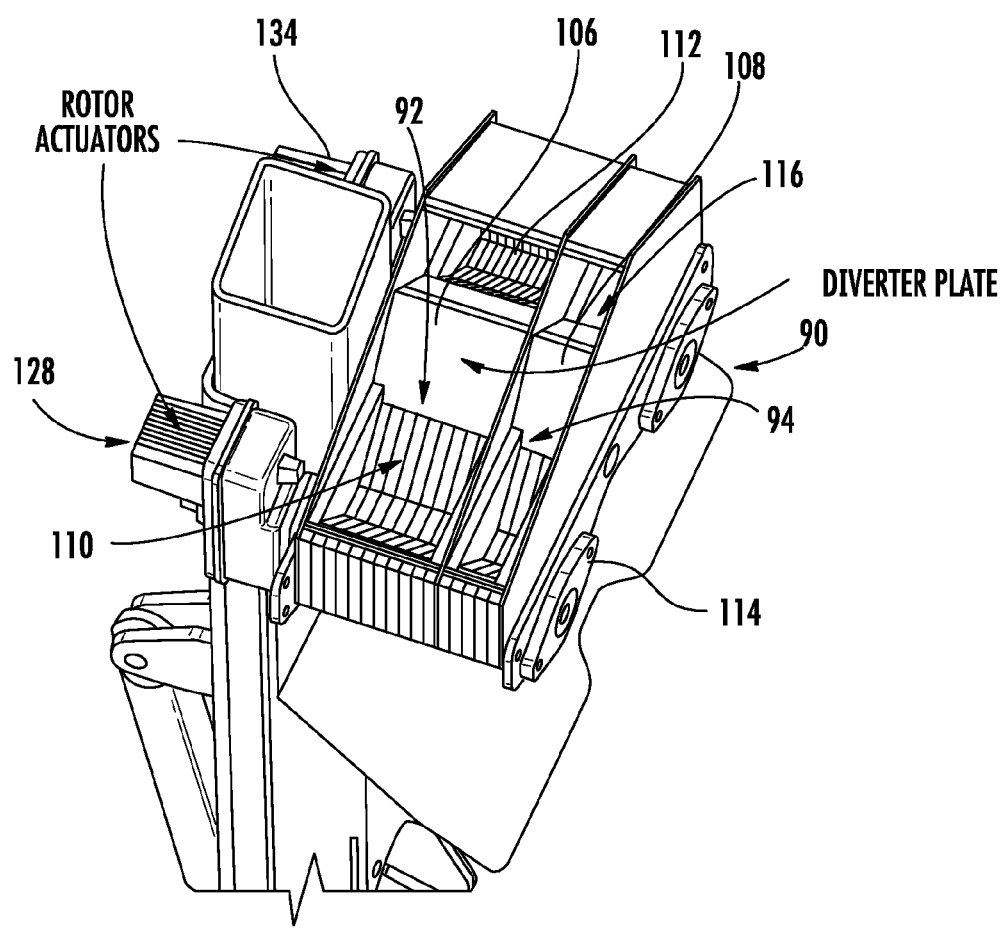
FIG. 5 illustrates a rear perspective view of an alternative embodiment of the present invention shown with row openers and a packing wheel.

Releasably secured to each depending portion (40) of the arm assemblies (36) is a seeder (90). In the preferred embodiment, the seeder (90) is provided with a front hopper (92) and a rear hopper (94). The dual hopper arrangement allows for different seeds to be applied to the field (18) at different rates. As an example, rye or clover seed may be provided in the front hopper (92) and a radish seed may be provided in the rear hopper (94). The hoppers (92) and (94) are supplied by two fifty-five bushel bins (96) and (98) (FIGS. 1 and 5). A blower fan (100) pushes air through tubes (102) and (104), that collect seeds from the bins (96) and (98) and pushes the air/seed mixture to the hoppers (92) and (94).

Figure 6:
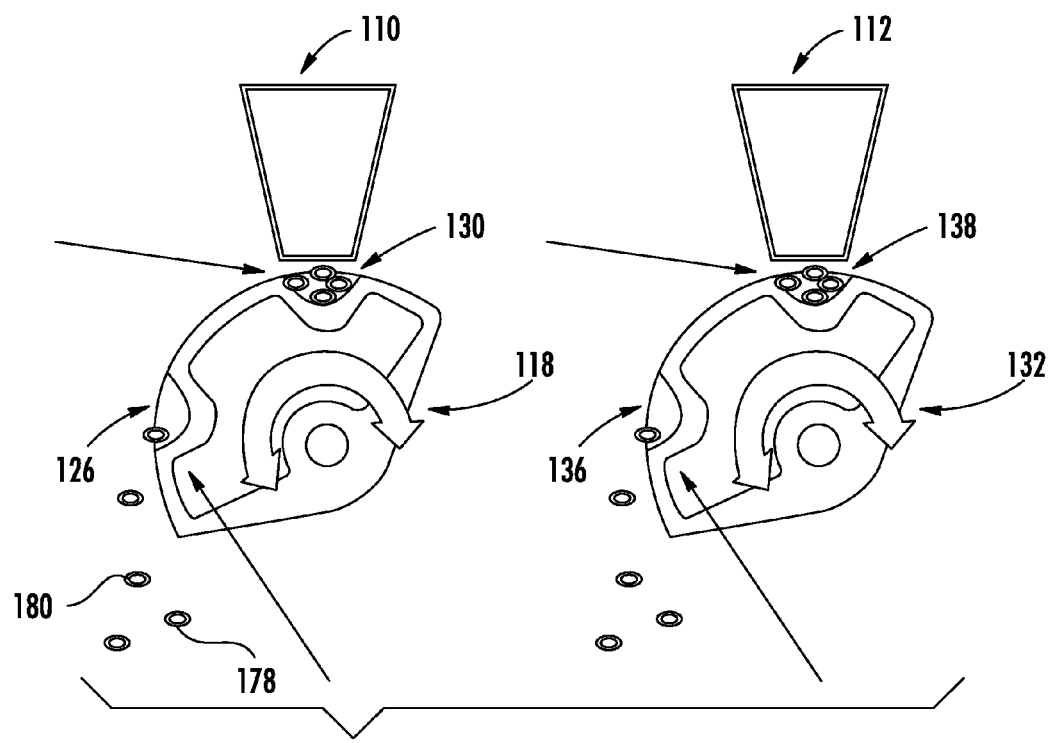
FIG. 6 illustrates a rear perspective view of the alternative embodiment of FIG. 5, shown with the row opener and packing wheel planting seed in a field.

As shown in FIG. 5, the hoppers (92) and (94), are each provided with a diverter plate (106) and (108). The first diverter plate (106) is an angled piece of steel, configured to distribute the seed exiting the tube (102) between a first seed supply (110) and a second seed supply (112) in the front hopper (92) (FIGS. 5-6). The second diverter plate (108) is also an angled piece of steel, configured to distribute the seed exiting the tube (104) between the first seed supply (114) and the second seed supply (116) in the rear hopper (94).

Figure 7:
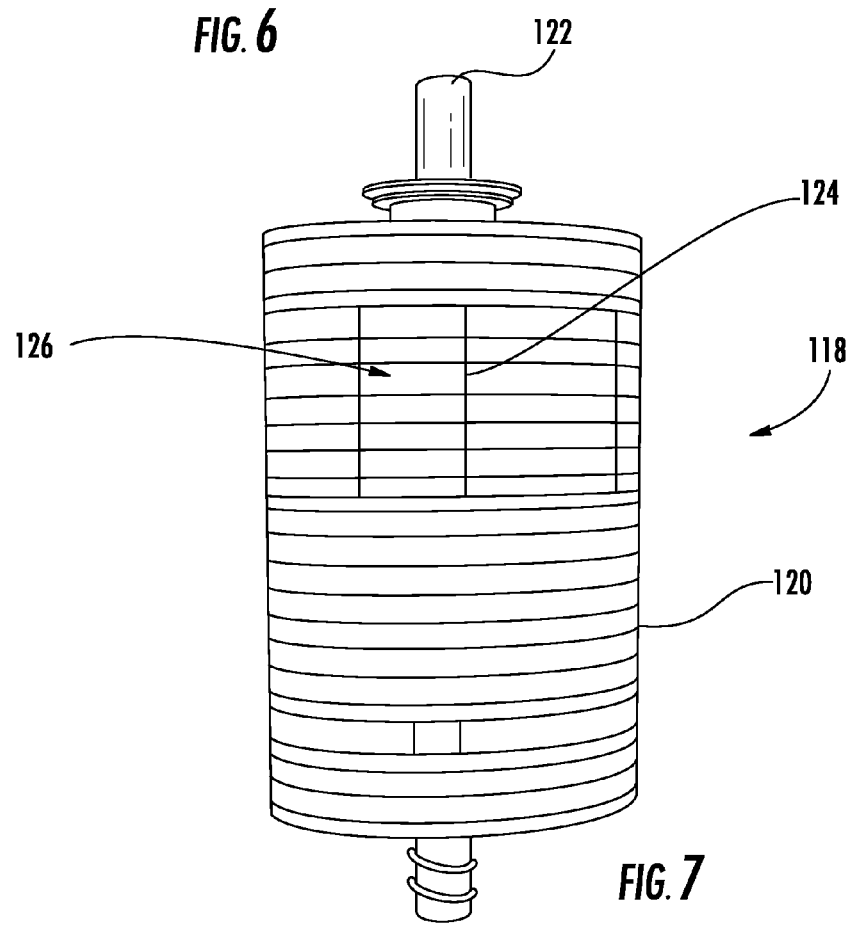
FIG. 7 illustrates a rear perspective view of an alternative embodiment of the present invention shown with row openers and tires.
Figure 8:
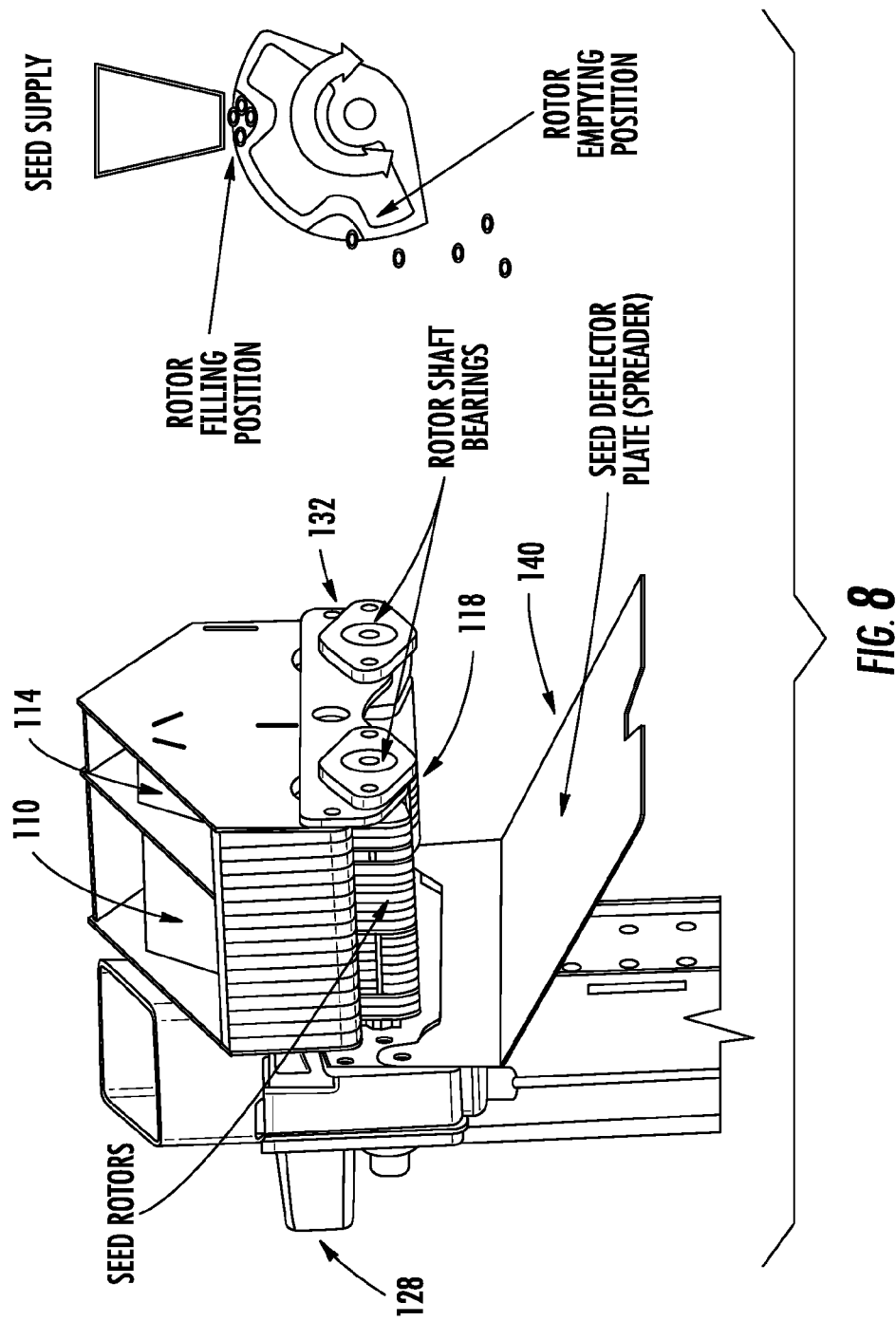
FIG. 8 illustrates a rear perspective view of an alternative embodiment of the present invention with row mounted broadcast spreaders coupled to the toolbar.

The first seed supply (110) in the front hopper (92) and the first seed supply (114) in the rear hopper (94) feed to a first seed metering rotor (118). As shown in FIG. 7, the first seed metering rotor (118) is a series of circular metal plates (120) provided around a steel axle (122). Several of the circular metal plates (120) are provided with scallops (124), so that when they are secured to the axle (122), they form a trough (126), having a semi-circular cross-section. Alternatively, the first seed metering rotor (118) may be of a solid construction. The first seed metering rotor (118) and trough (126) may be of any suitable dimensions. The trough (126) may be divided into multiple troughs (126) either linearly aligned or offset from one another.

The first seed metering rotor (118) is coupled to a first reciprocator, such as an electric rotor actuator (128), that rotates the first seed metering rotor (118) back and forth. The first electric rotor actuator (128) may have its own battery or may be driven from the vehicle's (12) electrical system. As shown in FIGS. 5-8, the first electric rotor actuator (128) rotates the first seed metering rotor (118) in a first direction, dumping seed from the first trough (126), and positioning a second trough (130) under the first seed supply (110) in the front hopper (92), and under the first seed supply (114) in the rear hopper (94) thereby filling the second trough (130) with seed. The first electric rotor actuator (128) then rotates the first seed metering rotor (118) in the opposite direction, dumping seed from the second trough (130), and positioning a first trough (126) under the first seed supply (110) in the front hopper (92), and under the first seed supply (114) in the rear hopper (94), thereby filling the first trough (126) with seed. The first electric rotor actuator (128) continues to rotate the first seed metering rotor (118) back and forth. The application rate of the seed can be adjusted by changing the design and/or the cycling frequency of the first seed metering rotor (118).

Similarly, the second seed supply (112) in the front hopper (92) and the second seed supply (116) in the rear hopper (94) feed to a second seed metering rotor (132). The second seed metering rotor (132) is coupled to a second reciprocator, such as a second electric rotor actuator (134), that rotates the second seed metering rotor (132) back and forth. As shown in FIGS. 5-7, the second electric rotor actuator (134) rotates the second seed metering rotor (132) in a first direction, dumping seed from a third trough (136), and positioning a fourth trough (138) under the second seed supply (112) in the front hopper (92), and under the second seed supply (116) in the rear hopper (94), thereby filling the fourth trough (138) with seed. The second electric rotor actuator (134) then rotates the second seed metering rotor (132) in the opposite direction, dumping seed from the fourth trough (138), and positioning a third trough (136) under the second seed supply (112) in the front hopper (92), and under the second seed supply (116) in the rear hopper (94), thereby filling the third trough (136) with seed. The second electric rotor actuator (134) continues to rotate the second seed metering rotor (132) back and forth. The application rate of the seed can be adjusted by changing the design and/or the cycling frequency of the second seed metering rotor (132).

Provided below the front hopper (92) and rear hopper (94), is a deflection plate (140), which is preferably a steel plate secured to depending portion (40) of the arm assembly (36). The deflection plate (140) is angled so as to deflect the seed falling from the seed metering rotors (118) and (132) toward the appropriate portion of the field (18). While the seeder (90) may be positioned as desired, in the preferred embodiment, the seeder (90) is positioned forward and above of the soil sealer (62).

Figure 9:
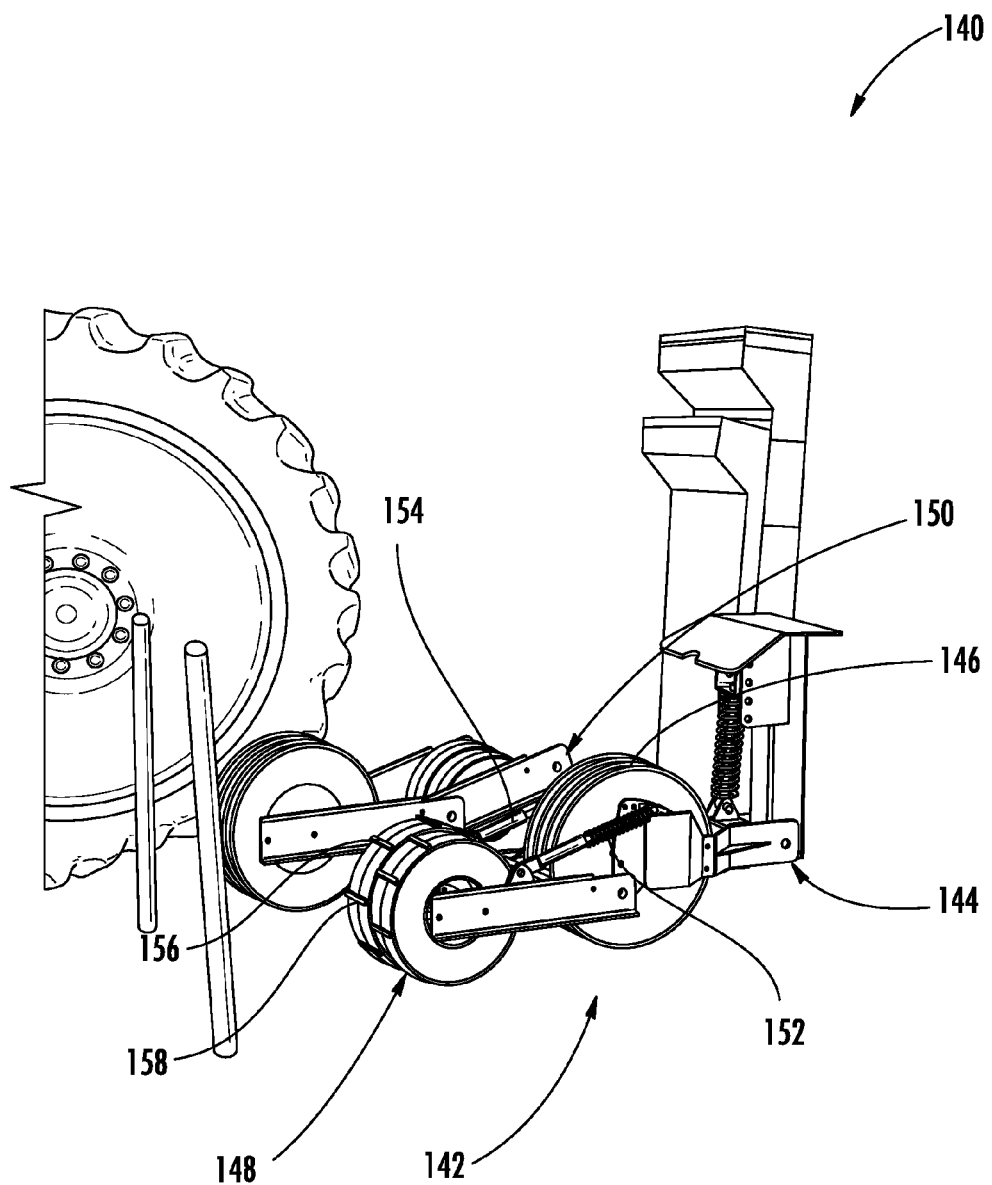
FIG. 9 illustrates a rear perspective view of an alternative embodiment of the agricultural inter-seeder of the present invention shown with a seedbed roll opener and a packing wheel with orthogonal treads.

An alternative embodiment of the present invention is shown generally as (140) in FIG. 9. As shown in FIG. 9, in the alternative embodiment, the trailing portion (142) of the arm assembly (144) is provided with a soil disrupter, such as a seedbed roll opener (146) and a packing wheel (148) such as those in the art. In this embodiment, the trailing portion (142) is provided with a return assembly (150) having two spring assemblies (152) and (154). As shown in FIG. 9, the packing wheel (148) is a flat rubber wheel (156) having orthogonal treads (158).

Figure 10:
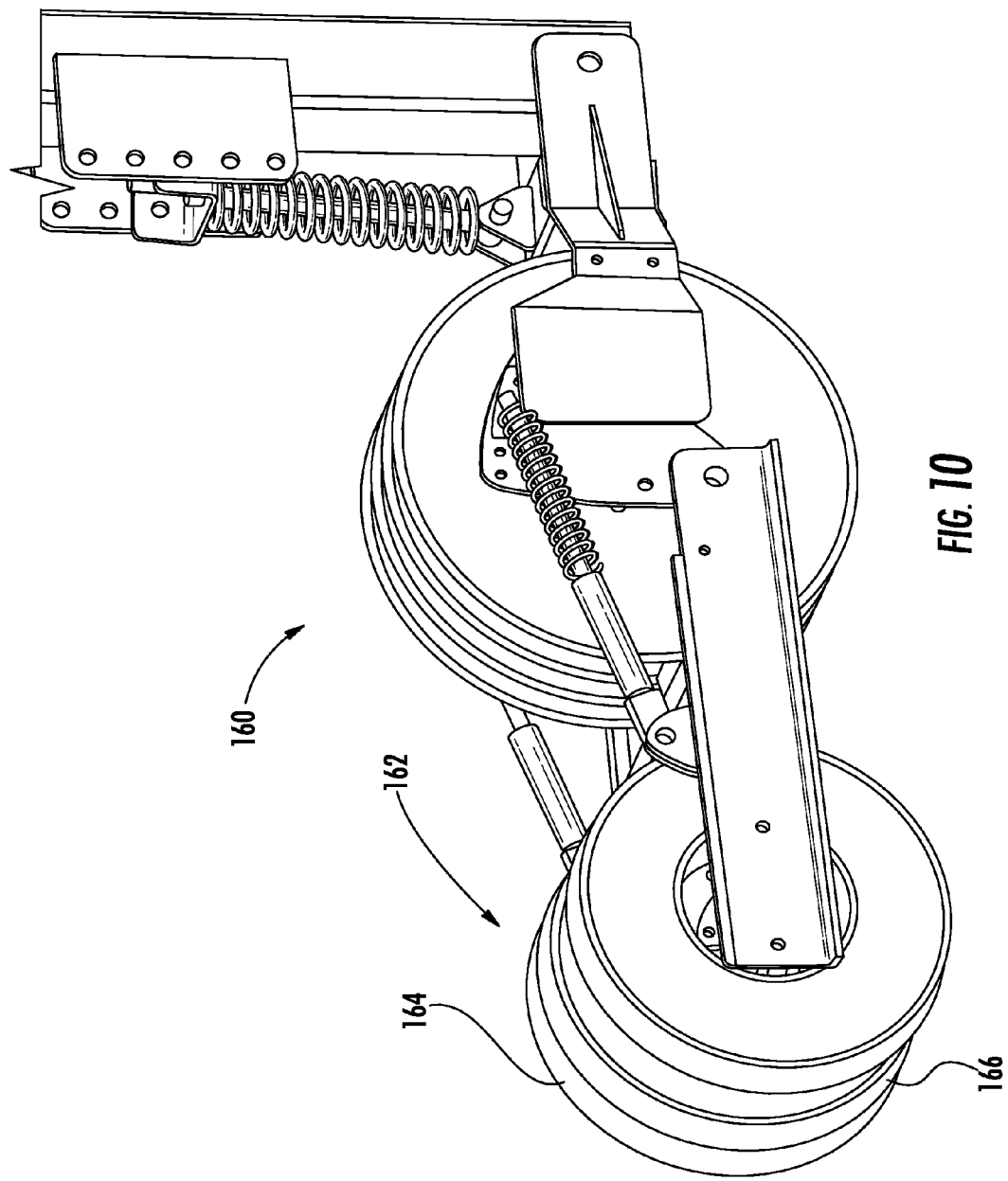
FIG. 10 illustrates a rear perspective view of an alternative embodiment of the agricultural inter-seeder of the present invention shown with a seedbed roll opener and a packing wheel with circumferential treads.

Another alternative embodiment of the present invention is shown generally as (160) in FIG. 10. In this embodiment, the packing wheel (162) may be a standard rubber tire (164) provided with circumferential treads (166).

Figure 11:
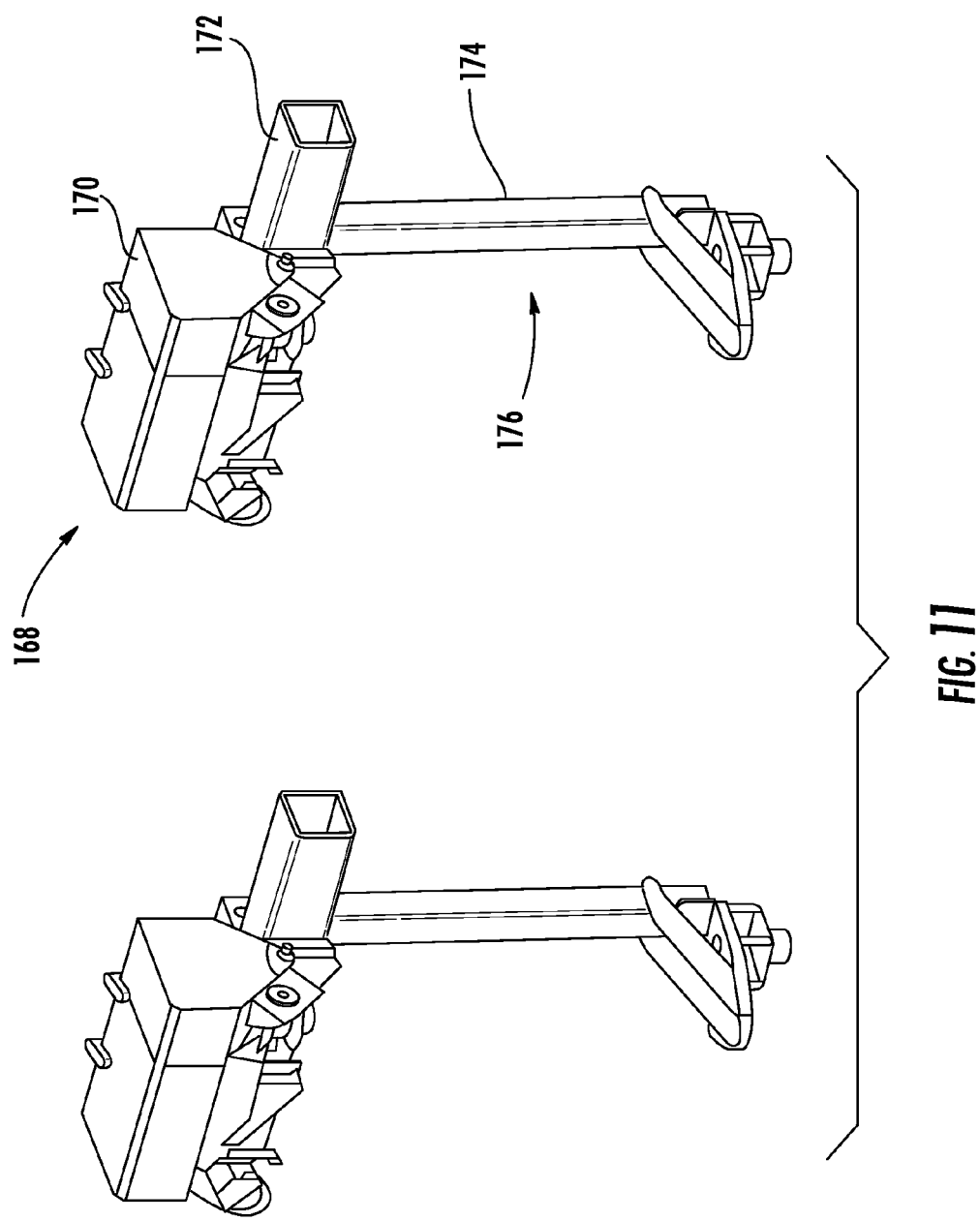
FIG. 11 illustrates a rear perspective view of an alternative embodiment of the agricultural inter-seeder of the present invention shown with a seeder releasably secured above the frame.

Yet another alternative embodiment of the present invention is shown generally as (168) in FIG. 11. In this embodiment of the present invention, the seeder (170) is secured above the frame (172) by releasable securement means, such as U-bolts known in the art. The seeder (170) may be positioned above the frame (172) if the row crops (20) are particularly dense and there is not enough clearance to position the seeder (170) on the depending portion (174) of the arm assembly (176).

When it is desired to use the agricultural inter-seeder (10), the arm assemblies (36) are adjusted to accommodate the row crops (20) in the field (18) (FIGS. 1-3, 5, and 6). The fifty-five bushel bins (96) and (98) are filled with seed (178) and (180), and the vehicle (12) is driven into the field (18). The hydraulic motor (22) is used to control the linear actuators (84) and the metering rotors (118) and (132) are controlled electronically by an operator in the cab of the vehicle (12).

As the agricultural inter-seeder (10) moves through the field (18), the seeder (90) drops seeds (178) and (180) onto the field (18) whereafter, the rolling basket (64) moves soil (182) over the seeds (178) and (180) to protect the seeds (178) and (180) and facilitate germination.

Although the invention has been described with respect to a preferred embodiment thereof, it is to be understood that it is not to be so limited since changes and modifications can be made therein which are within the full, intended scope of this invention as defined by the appended claims.

What is claimed is:

1. A system for applying seed below soil, comprising:
   (a) a toolbar;
   (b) a plurality of arms depending from the toolbar;
   (c) a soil sealer coupled to at least one arm of the plurality of arms; and
   (d) a seeder provided above the soil sealer;
   (e) wherein the seeder comprises:
      (i) a seed hopper;
      (ii) a rotor;
      (iii) a first trough provided in the rotor;
      (iv) a second trough provided in the rotor;
      (v) a reciprocator coupled to the rotor; and
      (vi) wherein the reciprocator is coupled to the rotor in a manner that reciprocates the rotor back and forth between a first position in which the first trough is in communication with the seed hopper and the second trough is in a dispensing orientation and a second position in which the second trough is in communication with the seed hopper and the first trough is in a dispensing orientation.

2. The system for applying seed below soil of claim 1, wherein the rotor is cylindrical.

3. The system for applying seed below soil of claim 1, wherein the first trough is provided with a semi-circular cross-section.

4. The system for applying seed below soil of claim 1, wherein the reciprocator is an electric motor.

5. The system for applying seed below soil of claim 1, further comprising:
   (a) a supplemental seed hopper; and
   (b) wherein the reciprocator is coupled to the rotor in a manner that reciprocates the rotor back and forth between a third position in which the first trough is in communication with the supplemental seed hopper and the second trough is in a dispensing orientation and a fourth position in which the second trough is in communication with the supplemental seed hopper and the first trough is in a dispensing orientation.

6. The system for applying seed below soil of claim 5, wherein the rotor is cylindrical.

7. The system for applying seed below soil of claim 5, further comprising a soil disrupter, wherein the seeder is oriented to deliver seeds between the soil disrupter and the soil sealer.

8. The system for applying seed below soil of claim 1, further comprising:
   (a) a supplemental seed hopper;

(b) a third trough provided in the rotor;
(c) a fourth trough provided in the rotor; and
(d) wherein the reciprocator is coupled to the rotor in a manner that reciprocates the rotor back and forth between a third position in which the third trough is in communication with the supplemental seed hopper and the fourth trough is in a dispensing orientation and a fourth position in which the fourth trough is in communication with the supplemental seed hopper and the third trough is in a dispensing orientation.

* * * * *